US012407120B2

(12) United States Patent
Chen

(10) Patent No.: US 12,407,120 B2
(45) Date of Patent: Sep. 2, 2025

(54) NETWORK CONNECTOR

(71) Applicant: ELLAX CORPORATION, Taoyuan (TW)

(72) Inventor: Yu-Jun Chen, Taoyuan (TW)

(73) Assignee: ELLAX CORPORATION, Taoyuan (TW)

( * ) Notice: Subject to any disclaimer, the term of this patent is extended or adjusted under 35 U.S.C. 154(b) by 294 days.

(21) Appl. No.: 18/233,844

(22) Filed: Aug. 14, 2023

(65) Prior Publication Data

US 2024/0113455 A1 Apr. 4, 2024

(30) Foreign Application Priority Data

Sep. 30, 2022 (TW) ................................ 111137384

(51) Int. Cl.
*H01R 12/58* (2011.01)
*H01R 24/64* (2011.01)
*H01R 107/00* (2006.01)

(52) U.S. Cl.
CPC ............ *H01R 12/58* (2013.01); *H01R 24/64* (2013.01); *H01R 2107/00* (2013.01); *H01R 2201/04* (2013.01)

(58) Field of Classification Search
CPC .... H01R 12/58; H01R 12/716; H01R 12/724; H01R 24/62; H01R 24/64; H01R 2201/64; H01R 2107/00
See application file for complete search history.

(56) References Cited

U.S. PATENT DOCUMENTS

| | | | | |
|---|---|---|---|---|
| 6,739,898 B1 * | 5/2004 | Ma | H01R 24/64 | 439/949 |
| 7,179,131 B2 * | 2/2007 | Caveney | H05K 1/0228 | 307/147 |
| 7,811,137 B2 * | 10/2010 | Chang | A61P 25/06 | 439/676 |
| 8,070,530 B1 * | 12/2011 | Kobayashi | H01R 24/64 | 439/676 |
| 8,992,264 B2 * | 3/2015 | Caveney | H01R 24/28 | 439/620.22 |
| 9,673,581 B1 * | 6/2017 | Chuang | H01R 24/64 | |
| 2005/0181676 A1 * | 8/2005 | Caveney | H01R 13/66 | 439/676 |
| 2008/0017485 A1 * | 1/2008 | Peng | H01R 13/6658 | 200/51.09 |
| 2011/0136393 A1 * | 6/2011 | Chang | H01R 12/523 | 439/676 |

(Continued)

*Primary Examiner* — Gary F Paumen
(74) *Attorney, Agent, or Firm* — Chun-Ming Shih; HDLS IPR SERVICES

(57) ABSTRACT

A structural improvement of a network connector includes a circuit board, a terminal base and a pin base. The circuit board is disposed with terminals and pins. The terminal base has a terminal installing part and an assembling part. The terminal installing part is used for each terminal to pass. The assembling part has a hollow zone and two vertical slot seats. The pin base has a pin penetrating part corresponding to each pin, and two fastening parts. Each vertical slot seat has a vertical slot. Each fastening part has a slider corresponding to each vertical slot seat and used for fastening with the vertical slot, thus the pin base and the assembling part of the terminal base are fastened at a rear side of the circuit board.

10 Claims, 7 Drawing Sheets

(56) References Cited

U.S. PATENT DOCUMENTS

| | | | | |
|---|---|---|---|---|
| 2013/0225011 | A1* | 8/2013 | Bopp | H01R 24/64 439/676 |
| 2015/0126074 | A1* | 5/2015 | AbuGhazaleh | H05K 1/18 29/842 |
| 2015/0200507 | A1* | 7/2015 | Caveney | H01R 13/46 439/676 |
| 2016/0181747 | A1* | 6/2016 | Gao | H01R 24/64 439/620.21 |

* cited by examiner

NETWORK CONNECTOR

BACKGROUND OF THE DISCLOSURE

Technical Field

The present disclosure relates to a connector, especially to a structural improvement of a network connector.

Description of Related Art

For avoiding being interfered by external electric waves during the signal transmission, a related-art network connector, such as a RJ45, is disposed with an electronic unit, such as a wave filter and a circuit thereof, for prevention. The wave filter is formed by soldering an electronic unit such as a coil on a circuit board, the disadvantage is that the processing procedure is complicated and occupies an unnecessary volume, thus the network connector may not be miniaturized. With the wave filtering unit being formed through an electronic unit such as an integrated circuit, the occupied volume is greatly reduced to achieve an objective to having a small volume.

However, when the wave filtering unit is soldered on the circuit board during the simplified procedure, terminals and pins required by the network connector are disposed on the circuit board. As such, the terminals and the pins themselves may lose the sufficient structural strength, and operations of inserting the network connector or the assembly soldering may be affected.

Accordingly, the applicant of the present disclosure has devoted himself for improving the mentioned shortages.

SUMMARY OF THE DISCLOSURE

The present disclosure is to provide a structural improvement of a network connector, in which terminals and pins of a network connector are integrated by utilizing a circuit board, and a terminal base is provided for reinforcing the assembling and structural strength, thus advantages of simplifying the structure and prolonging the service life are provided.

Accordingly, the present invention provides a structural improvement of a network connector, the network connector includes a circuit board, a terminal base disposed on a top surface of the circuit board and a pin base disposed on a bottom surface of the circuit board. The circuit board has a plurality of terminals protruded from the top surface thereof and a plurality of pins extended from the bottom surface thereof. The terminal base has a terminal installing part and an assembling part connected to a rear side of the terminal installing part. The terminal installing part is located above each of the terminals corresponding to the circuit board for each of the terminals to pass the terminal installing part. The assembling part has a hollow zone and two vertical slot seats, and the hollow zone is located on the top surface of the circuit board corresponding to each of the pins. The pin base has a pin penetrating part corresponding to each of the pins, and two fastening parts connected to a rear side of the pin penetrating part. The two fastening parts are upwardly extended from a rear side of the circuit board. Each vertical slot seat has a vertical slot. Each fastening part has a slider corresponding to each vertical slot seat and used for fastening the vertical slot, thus the pin base and the assembling part of the terminal base are fastened at the rear side of the circuit board.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION OF THE DISCLOSURE

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
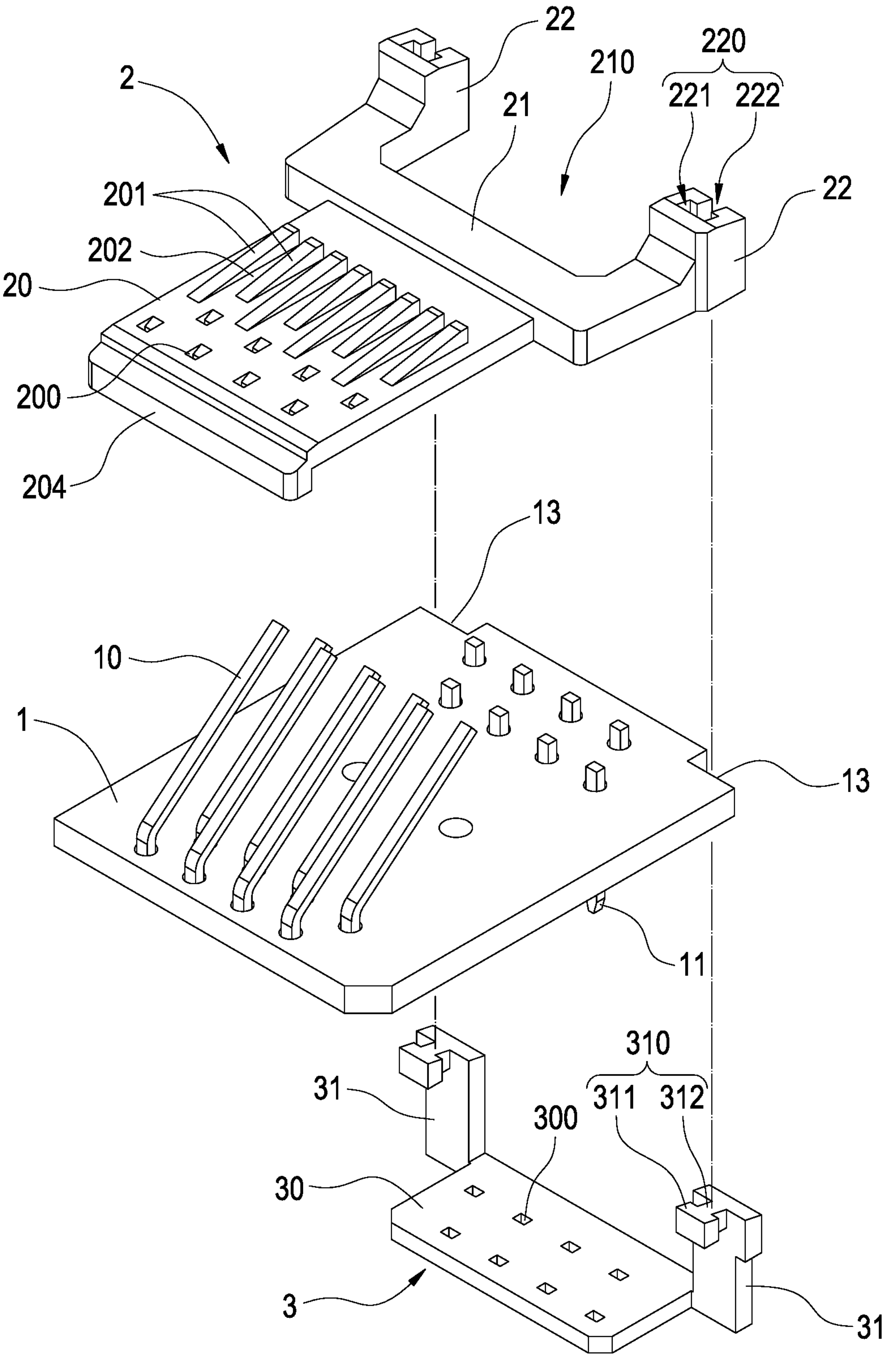
FIG. 1 is a perspective exploded view according to the present disclosure.
Figure 2:
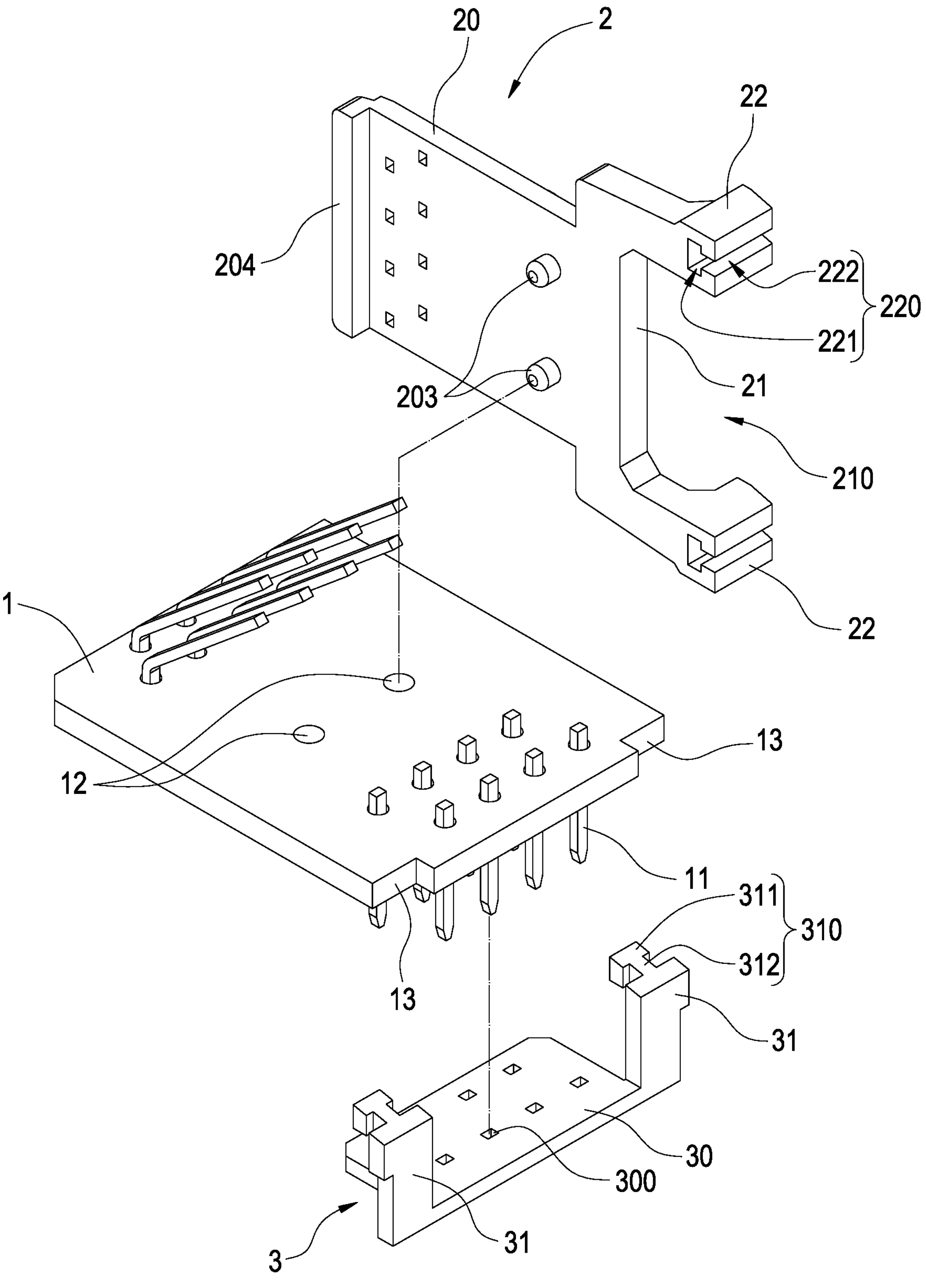
FIG. 2 is another perspective exploded view according to the present disclosure.

Please refer to FIG. 1 and FIG. 2, FIG. 1 is a perspective exploded view according to the present disclosure and FIG. 2 is another perspective exploded view according to the present disclosure. The present disclosure provides a structural improvement of a network connector, the network connector includes a circuit board 1, a terminal base 2 and a pin base 3.

The circuit board 1 is disposed with a circuit or an electronic unit (not shown in figures) used for filtering waves. A plurality of terminals 10 are protruded from a top surface of the circuit board 1, and a plurality of pins 11 are extended from a bottom surface of the circuit board 1. In some embodiments, the terminals 10, and the pins 11 are disposed at two sides of the circuit board 1. For example, the terminals 10 are disposed at a front side of the circuit board 1, and the pins 11 are disposed at a rear side of the circuit board 1. Through an arranging relation within a certain distance, the desired circuit or the electronic unit used for filtering waves may be arranged on the circuit board 1 and relatively disposed between the terminals 10 and the pins 11.

The terminal base 2 is disposed on the top surface of the circuit board 1 corresponding to each of the terminals 10 of the circuit board 1. The terminal base 2 may be formed through a plastic ejection molding manner. The terminal base 2 includes a terminal installing part 20 and an assembling part 21 connected at a rear side of the terminal installing part 20. The terminal installing part 20 is disposed with a positioning hole 200 corresponding to each of the terminals 10 and allowing each of the terminals 10 to pass, and the positioning hole 200 is correspondingly arranged above each of the terminals 10 relative to the circuit board 1. Each of the terminals 10 on the top surface of the circuit board 1 is in an inclined status after passing the positioning hole 200, thus each of the terminals 10 is pressed after being inserted and contacting with an engaging connector. As such, a wedge-shaped pad 201 is protruded from a rear side of each of the positioning holes 200 to prevent the terminal 10 from being overly pressed. A gap 202 is formed between the wedge-shaped pads 201 to dividing the wedge-shaped pads 201. Moreover, the terminal base 2 is disposed with at least one convex piece 203 on a bottom surface of the terminal installing part 20 to be fastened in a fixing hole 12 of the circuit board 1, and the fixing hole 12 is located between each of the terminals 10 and each of the pins 11.

Details are provided as follows. The assembling part 21 of the terminal base 2 is disposed at a location of each of the pins 11 corresponding to the circuit board 1. The assembling part 21 has a hollow zone 210 and two vertical slot seat 22 formed correspondingly. The hollow zone 210 is located on the top surface of the circuit board 1 corresponding to each of the pins 11 to avoid a soldered location of the pins 11 and the circuit board 1. The two vertical slot seats 22 are disposed close to the rear side of the circuit board 1 and respectively formed with a vertical slot 220, thus the pin base 3 is fastened with the assembling part 21 to make the pin base 3 and the assembling part 21 both be fastened at the rear side of the circuit board 1.

Figure 3:
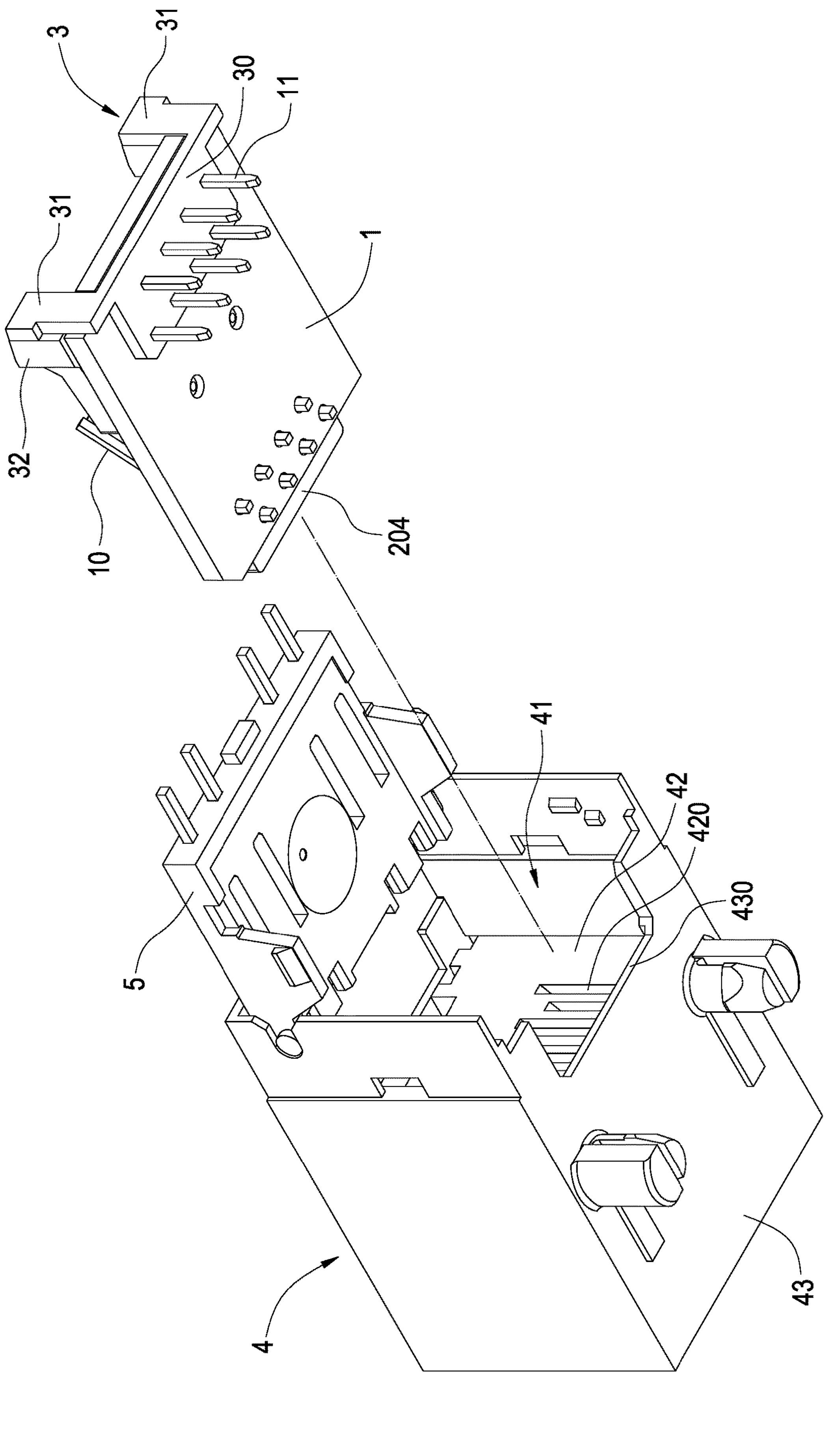
FIG. 3 is a perspective exploded view showing the present disclosure being disposed in the housing.

Please refer to FIG. 3, the pin base 3 is disposed on the bottom surface of the circuit board 1 corresponding to each of the pins 11 of the circuit board 1. The pin base 3 may be formed through a plastic injection molding manner. The pin base 3 has a pin penetrating part 30 and two fastening parts 31 connected to a rear side of the pin penetrating part 30. The pin penetrating part 30 is formed with a through hole 300 corresponding to each of the pins 11 and allowing each of the pins 11 to penetrate. As such, the stability of each of pins 11 being soldered on the circuit board 1 is increased via the pin penetrating part 30. The two fastening parts 31 are upwardly extended from the rear side of the circuit board 1 to be corresponding to the two vertical slot seats 22 of the assembling part 21, and the two fastening parts 31 respectively have a slider 310 fastened in the vertical slot 220. In some embodiments, the slider 310 is formed in a convex status and has a wider bottom protrusion 311 and a narrower top protrusion 312. The vertical slot 220 has a bottom recess 221 matched with the bottom protrusion 311, and a top recess 222 matched with the top protrusion 312. As such, with the geometrical design, the combining strength of the slider 310 and the vertical slot 220 is increased. In some embodiment, for example the slider 310 may be formed in a dovetail shape and the vertical slot 220 may be a matched dovetail-shaped slot.

For initially positioning the two fastening parts 31 and the rear side of the circuit board 1, a rear edge of the circuit board 1 is concavely formed with notches 13 corresponding to the two fastening parts 31.

Accordingly, the structural improvement of the network connector of the present disclosure is assembled through the aforesaid structure.

Figure 4:
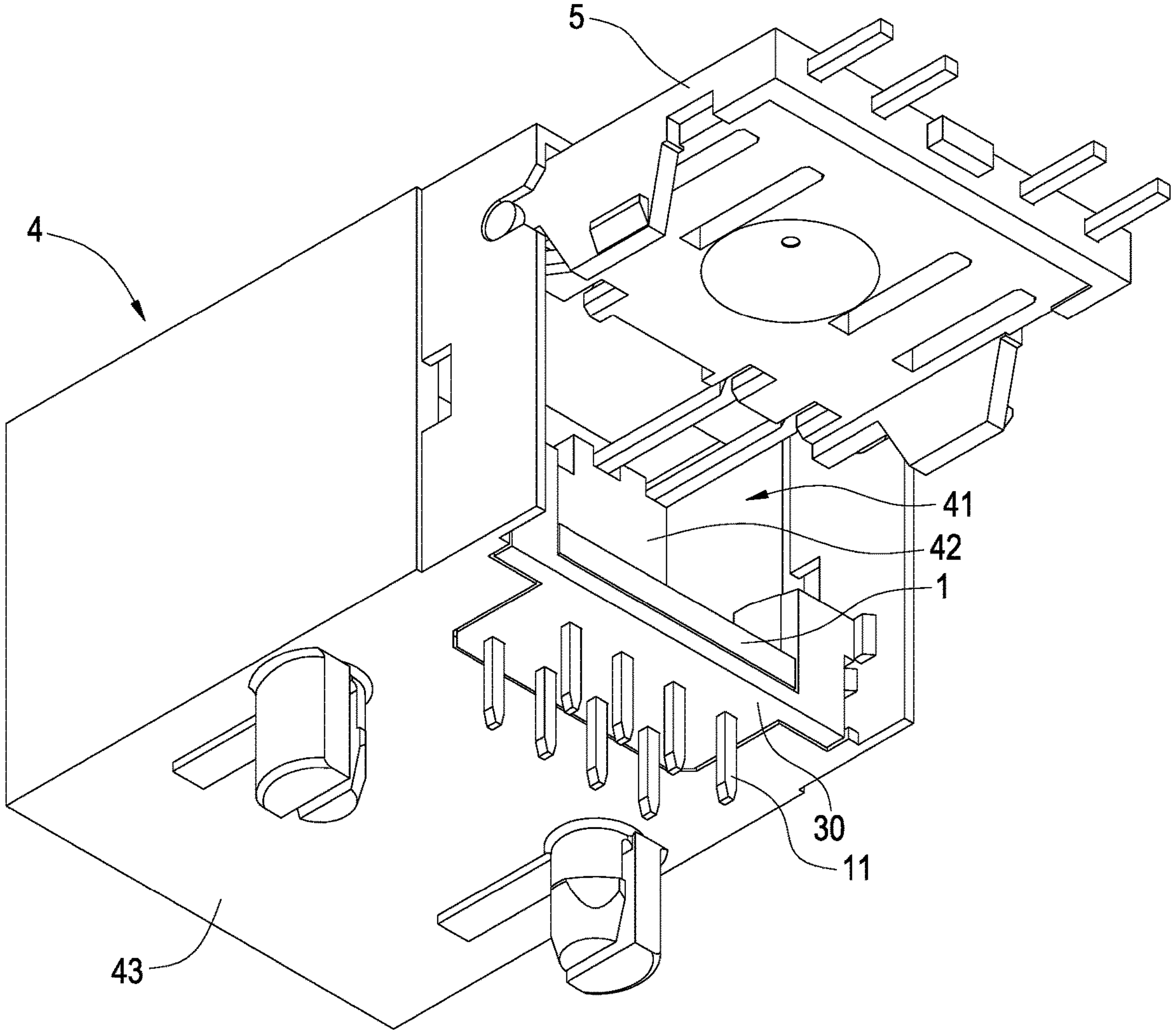
FIG. 4 is a perspective view showing the assembly of the present disclosure being disposed in the housing.
Figure 5:
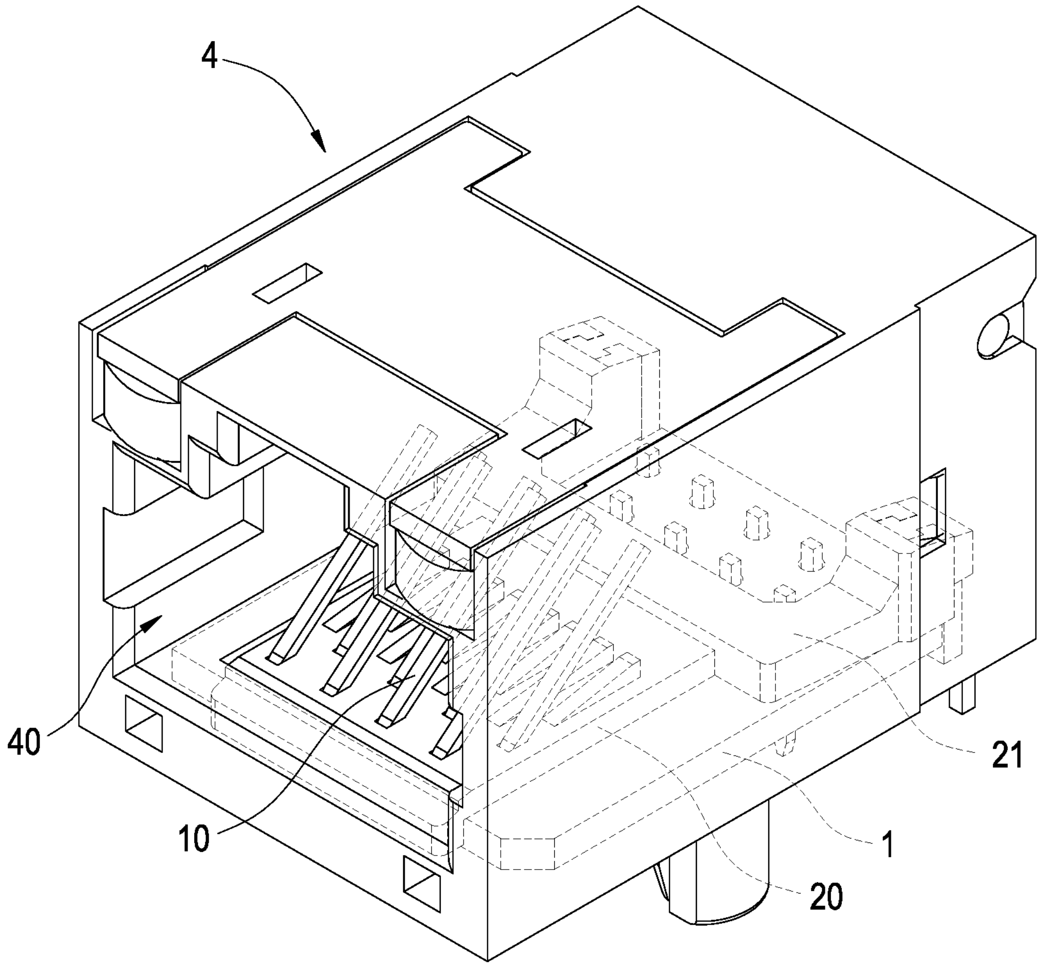
FIG. 5 is another perspective view showing the assembly of the present disclosure being disposed in the housing.
Figure 6:
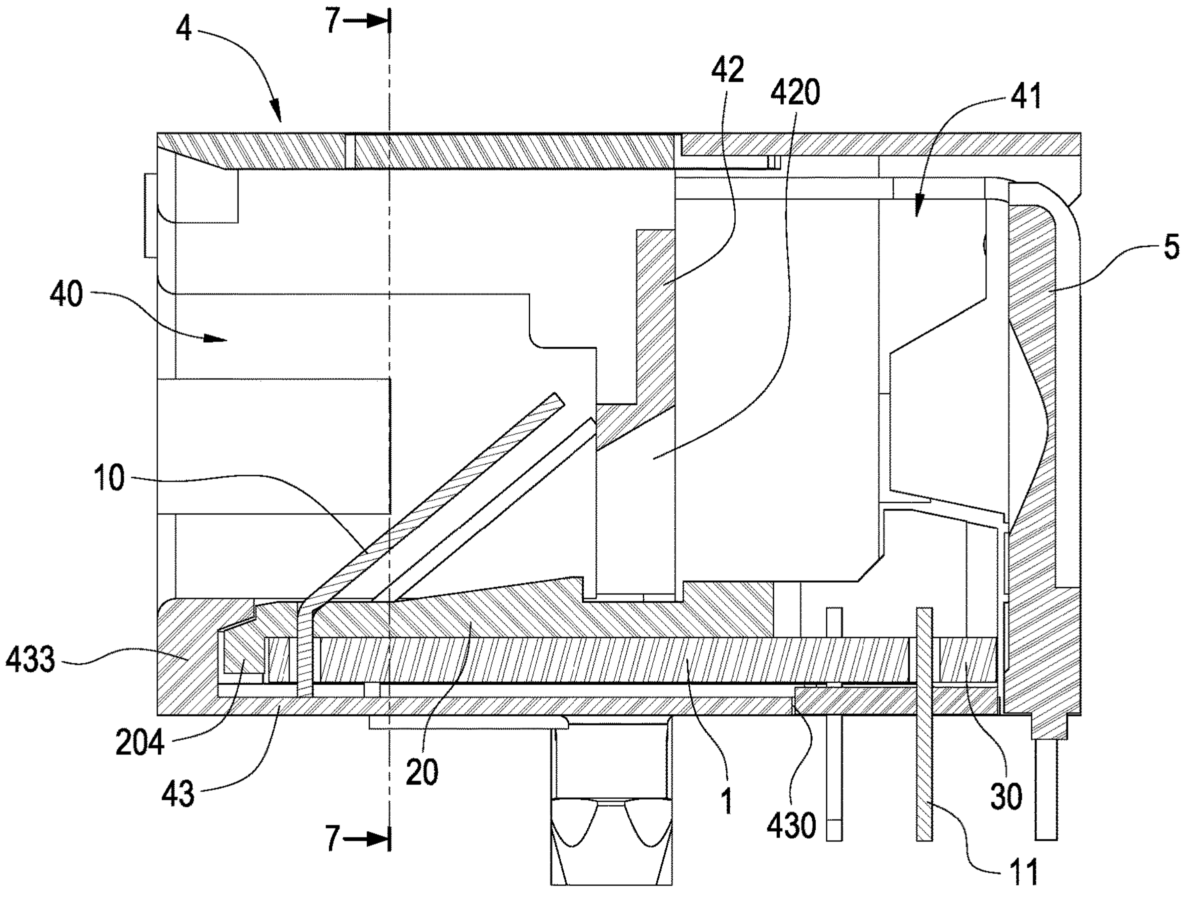
FIG. 6 is a cross-sectional view showing the present disclosure being disposed in the housing.

Please refer to FIG. 3, FIG. 4, FIG. 5 and FIG. 6, the present disclosure further includes a housing 4. An inserting port 40 is concavely disposed at a front side of the housing 4, and the inserting port 40 allows the engaged connector to be inserted. A rear end of the housing 40 has an accommodating zone 41 defined concavely. A partition wall 42 located in the housing 4 is formed between the inserting port 40 and the accommodating zone 41. The partition wall 42 is disposed with a plurality of bypass slots 420 corresponding to each of the terminals 10 to make the assembled circuit board 1, the terminal base 2 and the pin base 3 be disposed from the accommodating zone 41 at the rear side of the housing 4, thus each of the terminals 10 pass the bypass slot 420 to be located in the inserting port 40 of the housing 4, as shown in FIG. 5 and FIG. 6.

Figure 7:
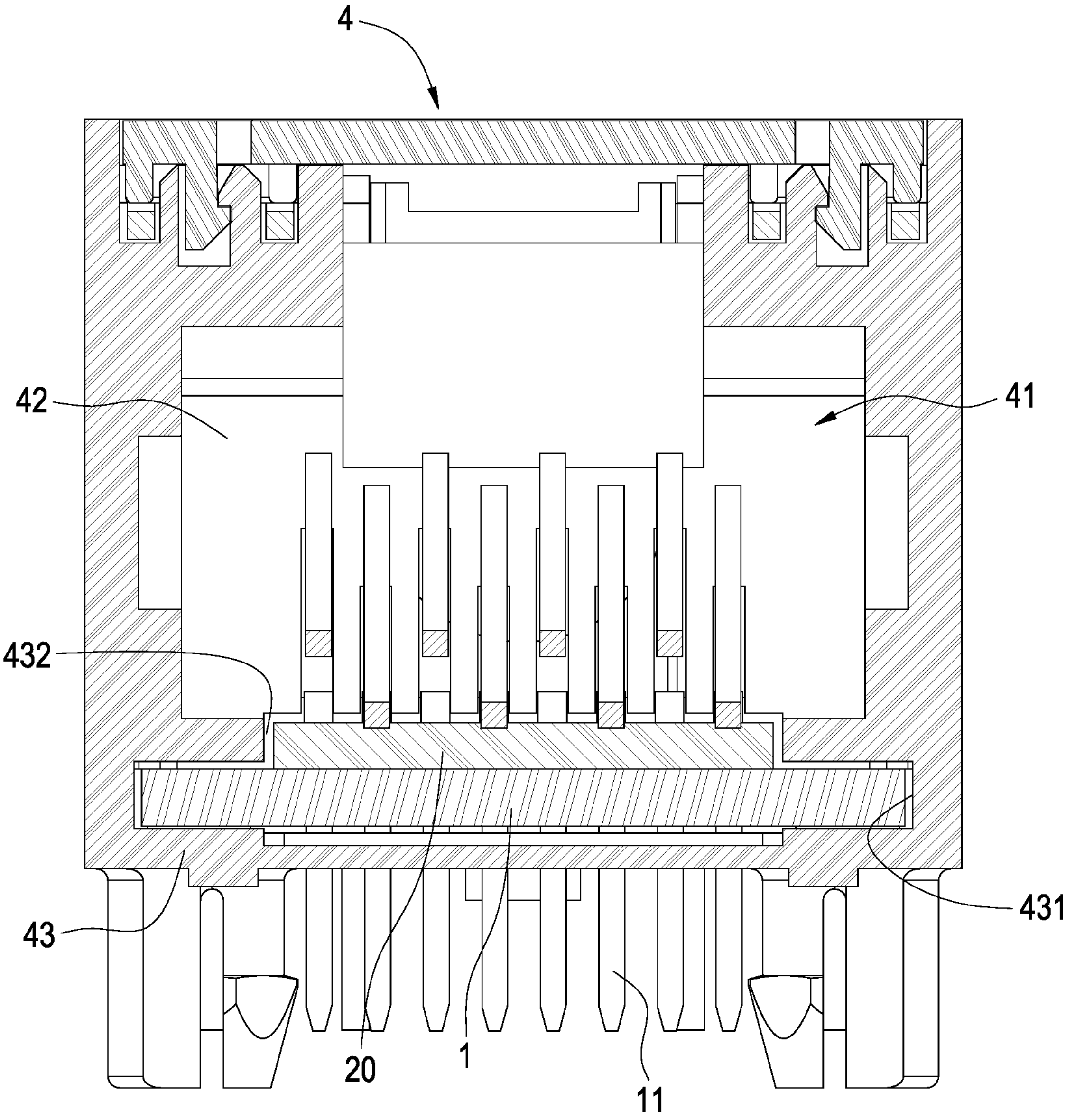
FIG. 7 is a cross-sectional view of FIG. 6 along a dashed line 7-7.

Please refer to FIG. 3 and FIG. 4, a bottom part 43 of the housing 4 is formed with a slit 430 which is corresponding to an opening of the accommodating zone 41 and in a recessed status and allows the pin base 3 to be mounted, thus each of the pins 11 is directly exposed from the bottom part 43 of the housing 4. Please refer to FIG. 6 and FIG. 7, the bottom part 43 of the housing 4 is disposed with a first position limiting slot 431 allowing the circuit board 1 to be mounted and a second position limiting slot 432 exposed in the inserting port 40. The second position limiting slot 432 allows the terminal installing part 20 to be mounted and positioned. The bottom part 43 of the housing 4 is further disposed with a pressing part 433 at a front side defined in the inserting port 40, and a front edge of the terminal installing part 20 is protruded with a pressing edge 204 which is downwardly pressed by the pressing part 433, thus the terminal base 2 is prevented from tilting, and the inserting and contacting operation of the terminals 10 is not affected.

While this disclosure has been described by means of specific embodiments, numerous modifications and variations could be made thereto by those skilled in the art without departing from the scope and spirit of this disclosure set forth in the claims.

What is claimed is:

1. A network connector, comprising:

a circuit board, comprising a plurality of terminals disposed protrusively from a top surface thereof and a plurality of pins extended from a bottom surface thereof;

a terminal base, disposed on the top surface of the circuit board and comprising a terminal installing part and an assembling part connected to a rear side of the terminal installing part, wherein the terminal installing part is located above the terminals corresponding to the circuit board for the terminals to pass therethrough, the assembling part comprises two vertical slot seats and a hollow zone defined between the vertical slot seats, and the hollow zone is defined corresponding to the pins and located on the top surface of the circuit board; and a pin base, disposed on the bottom surface of the circuit board corresponding to the pins and comprising a pin penetrating part and two fastening parts connected to a rear side of the pin penetrating part, wherein the two fastening parts are upwardly extended from a rear side of the circuit board;

wherein, each vertical slot seat comprises a vertical slot, each fastening part comprises a slider fastened to the vertical slot corresponding to each vertical slot seat, and the circuit board is sandwiched between the pin base and the assembling part of the terminal base at the rear side thereof.

2. The network connector according to claim 1, wherein the circuit board comprises at least one fixing hole, and the terminal installing part comprises at least one convex piece disposed on a bottom surface thereof and fastened in the fixing hole.

3. The network connector according to claim 1, wherein the circuit board comprises multiple notches concavely defined on a rear edge thereof corresponding to the two fastening parts.

4. The network connector according to claim 1, wherein the terminal installing part comprises multiple positioning holes for the terminals to pass through, and the terminals of the circuit board pass through the positioning holes to be in an inclined status.

5. The network connector according to claim 4, wherein the terminal installing part comprises a wedge-shaped pad disposed protrusively on a rear side of each of the positioning holes.

6. The network connector according to claim 1, wherein the pin penetrating part comprises multiple through holes for the pins to penetrate.

7. The network connector according to claim 1, further comprising a housing, wherein the housing comprises an inserting port defined concavely on a front side thereof and an accommodating zone defined concavely on a rear end thereof, the circuit board, the terminal base and the pin base are disposed in the housing from the accommodating zone, and the terminals are located in the inserting port of the housing.

8. The network connector according to claim 7, wherein the housing comprises a partition wall located between the inserting port and the accommodating zone, and the partition wall comprises a plurality of bypass slots corresponding to the terminals.

9. The network connector according to claim 7, wherein the housing comprises a slit concavely defined on a bottom part thereof corresponding to an opening of the accommodating zone for the pin base to be mounted, and the pins are exposed from the bottom part of the housing.

10. The network connector according to claim 7, wherein the housing comprises a first position limiting slot defined on a bottom part thereof for the circuit board to be mounted and a second position limiting slot defined in the inserting port for the terminal installing part to be mounted, the housing further comprises a pressing part disposed on the bottom part thereof at a front side in the inserting port, and the terminal installing part comprises a pressing edge disposed protrusively on a front edge thereof and downwardly pressed by the pressing part.

* * * * *